J. WYMORE.
COMBINED BOAT AND AIRSHIP.
APPLICATION FILED JUNE 6, 1911.
1,023,404.
Patented Apr. 16, 1912.
2 SHEETS—SHEET 1.
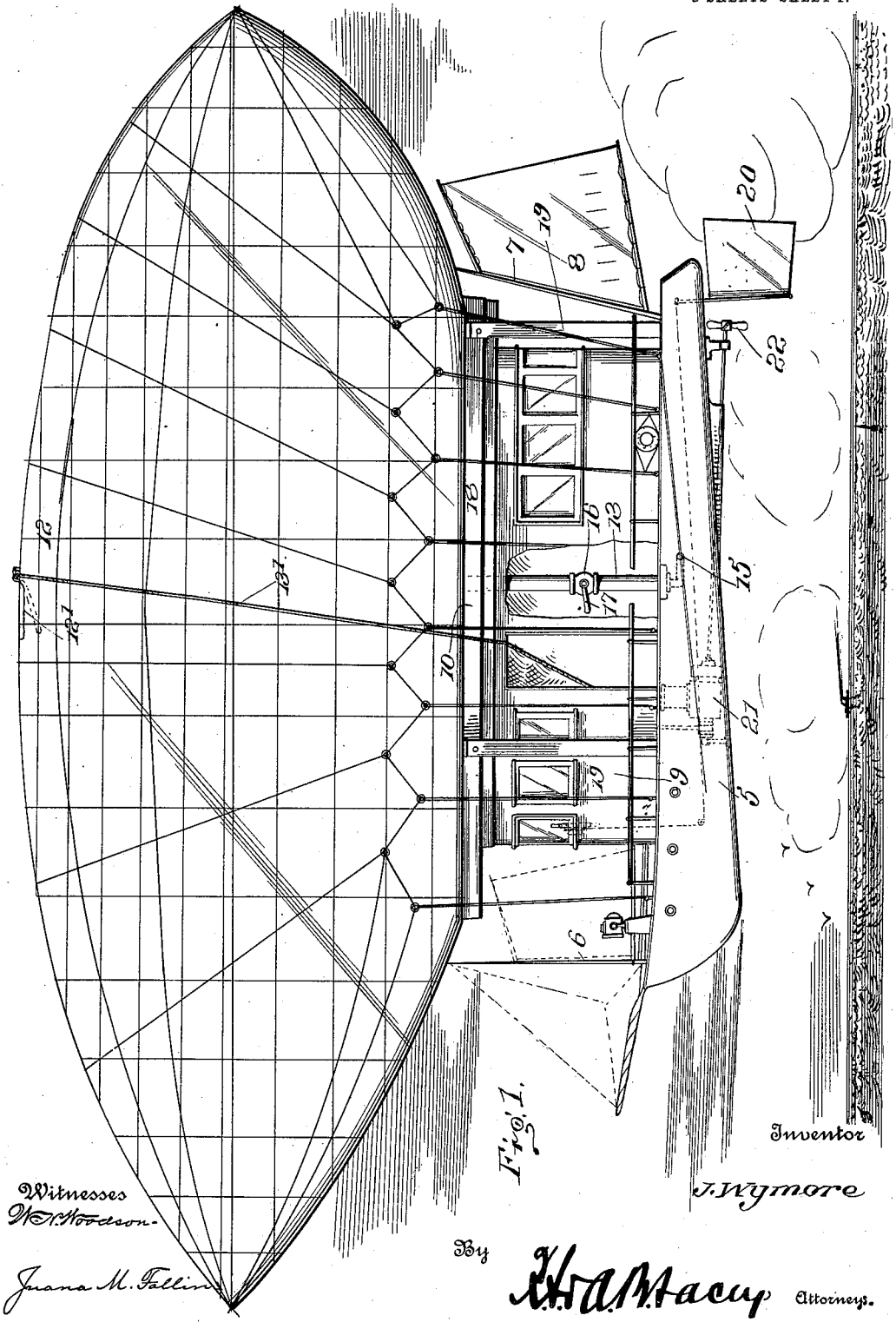

J. WYMORE.
COMBINED BOAT AND AIRSHIP.
APPLICATION FILED JUNE 6, 1911.
1,023,404.
Patented Apr. 16, 1912.
2 SHEETS—SHEET 2.
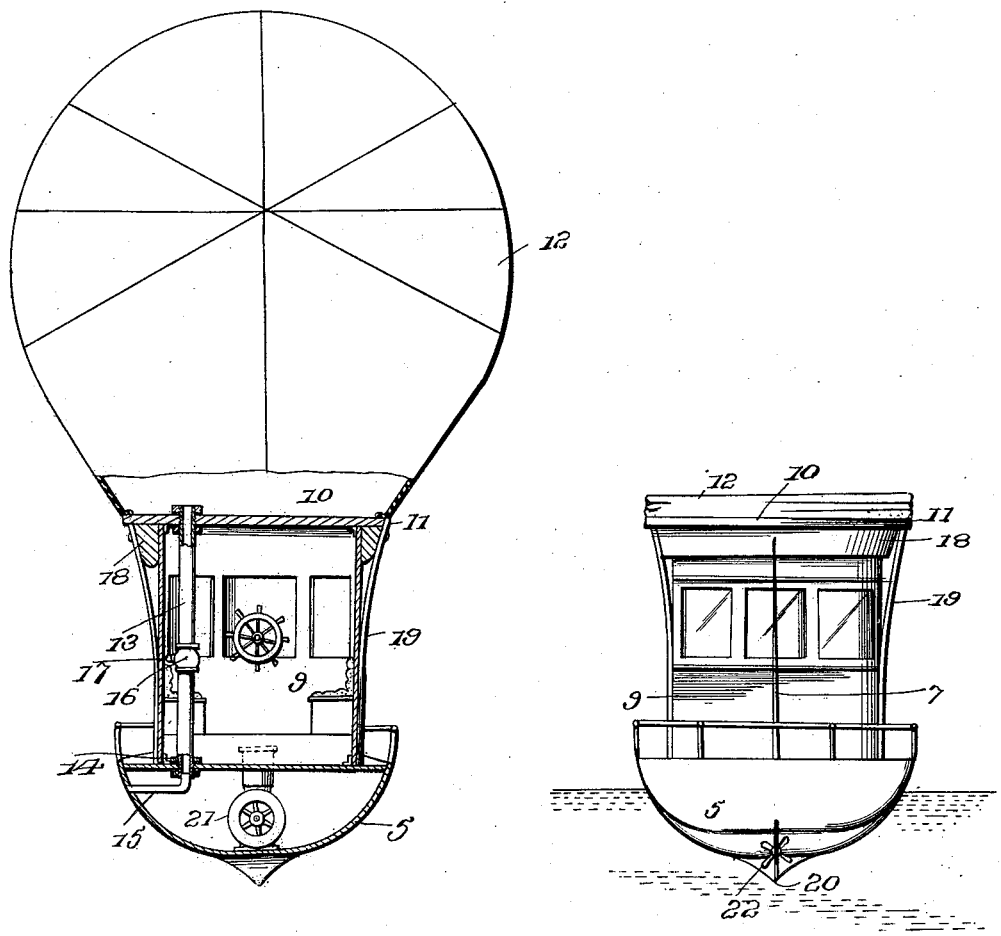

UNITED STATES PATENT OFFICE.

JOSEPH WYMORE, OF SEATTLE, WASHINGTON.

COMBINED BOAT AND AIRSHIP.

1,023,404.  Specification of Letters Patent.  Patented Apr. 16, 1912.

Application filed June 6, 1911. Serial No. 631,627.

*To all whom it may concern:*

Be it known that I, JOSEPH WYMORE, citizen of the United States, residing at Seattle, in the county of King and State of Washington, have invented certain new and useful Improvements in Combined Boats and Airships, of which the following is a specification.

This invention relates to air-ships and more particularly to a combined air-ship and marine vessel.

The object of the invention is to provide an air-ship having a boat or other vessel suspended therefrom so that the ship may be used for either marine or aerial navigation.

A further object is to provide an air-ship including a hull having a cabin mounted thereon and to which is secured a gas bag or field, means being provided for inflating the bag when the ship is to be used for aerial navigation and for permitting the escape of gas when it is desired to descend on a body of water and use the craft as a marine vessel.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claim.

For a full understanding of the invention and the merits thereof, reference is to be had to the following description and accompanying drawings, in which:

Figure 1 is a perspective view of a combined air-ship and marine vessel embodying the present invention, showing the air-ship in flight; Fig. 2 is a transverse sectional view of the same, partly in elevation; Fig. 3 is a rear elevation, showing the air-ship used as a marine vessel.

Corresponding and like parts are referred to in the following description and indicated in all the views of the drawings by the same reference characters.

The combined air-ship and marine vessel forming the subject matter of the present invention comprises a hull 5 of any suitable size and shape and formed of wood, metal or other material, said hull being provided with fore and aft masts 6 and 7 carrying sails 8. Mounted on the hull 5, is a cabin 9 to accommodate the crew and passengers, said cabin being provided with the usual doors, and windows and having the cover or roof 10 thereof projected laterally on opposite sides of the cabin to form an overhanging flange 11. Secured to the outer or free edge of the flange 11, is a gas bag 12, preferably formed of silk, canvas or other material coated with a water-proof compound to prevent the escape of gas, said bag being preferably pointed at its opposite ends so as to offer the least possible air resistance.

Depending from the roof or cover 10 of the cabin, is a pipe 13, the upper end of which communicates with the interior of the bag 12, while the lower end thereof is threaded for engagement with a coupling 14, the latter being provided with an angular nipple 15 extending through an opening in the side of the hull for attachment to a gas supply pipe. A suitable valve 12' is arranged at the top of the bag 12 and provided with an operating cord 13' so that the valve 12' may be conveniently opened to permit the escape of gas from the member 12, when it is desired to descend on a lake, river or other body of water and use the ship as a marine vessel. Connected in the pipe 13, is a valve 16 having a terminal handle 17 by means of which the valve may be rotated to control the flow of gas to the bag 12.

Secured to the opposite sides of the cabin, are longitudinal reinforcing strips 18, which latter bear against the lower face of the flange 11, there being curved braces 19 forming a connection between the flange 11 and the hull of the boat in order to form a strong, rigid structure. The hull 5 is provided with the usual rudder 20 and a motor 21 to be used for driving a propeller 22, when the vessel descends on a body of water. When the craft is used as an air-ship, the valve 16 is moved to open position and a hose or other flexible conductor connected to the nipple 15 so as to allow gas from a suitable source of supply to flow through the conductor and pipe 13 to the interior of the bag 12, thereby to inflate said bag. The valve 16 is then closed and the usual ballast on the hull thrown overboard, thus allowing the balloon to ascend.

It will of course be understood that when the ship is used for aerial navigation, the rudder 20 will be removed and a comparatively large rudder placed in position on the hull and operatively connected with the steering wheel of the vessel so as to guide said vessel when in flight. When it is desired to descend on a body of water, as for instance, the ocean, the valve 12' is moved to open position which permits the escape of gas from the bag 12 to the atmosphere, thus causing the bag to collapse so that the craft will be converted from an air-ship to a marine vessel. When the ship is used for marine purposes, the large rudder is removed and the rudder 20 placed in position thereon so that by starting the motor 21, the vessel will be propelled through the water like any other ordinary boat.

It will of course be understood that when the craft is used as an air-ship, the sails 8 will be furled, and that when the ship is used as a marine vessel, said sails may be unfurled and used for propelling the vessel in case of accident to the motor.

The air-ships may be made in different sizes so as to accommodate any number of passengers, and if desired, the gas bag or field, instead of being elliptical in shape, may be round, cylindrical or of any other cross sectional formation, without departing from the spirit of the invention.

Having thus described the invention, what is claimed as new is:

An air-ship including a hull, a cabin mounted on the hull and having the roof thereof extended laterally beyond the side walls of the cabin to form a marginal flange, braces forming a connection between the flange and hull, longitudinal reinforcing strips secured to the sides of the cabin and bearing against said flange and braces, respectively, a gas bag secured to the flange, a pipe extending through the roof of said cabin for conducting gas to said bag, a coupling engaging the lower end of the pipe and provided with a laterally extending discharge nipple opening through one side of the hull, a valve casing connected in the pipe, a valve for controlling the flow of gas to the gas bag, a second valve for permitting the escape of gas when deflating said bag, and a motor for propelling the hull when the gas bag is deflated.

In testimony whereof, I affix my signature in presence of two witnesses.

JOSEPH WYMORE. [L. S.]

Witnesses:
 WILLIAM H. THOMPSON,
 ALBERT T. WILSON.

---

Copies of this patent may be obtained for five cents each, by addressing the "Commissioner of Patents, Washington, D. C."